United States Patent [19]

Sato

[11] Patent Number: 4,541,588
[45] Date of Patent: Sep. 17, 1985

[54] RECORDING TAPE CARTRIDGE

[75] Inventor: Akihiko Sato, Nagaokakyo, Japan

[73] Assignee: Hitachi Maxell, Ltd., Osaka, Japan

[21] Appl. No.: 526,525

[22] Filed: Aug. 26, 1983

[30] Foreign Application Priority Data

Aug. 28, 1982 [JP] Japan .............. 57-130110[U]

[51] Int. Cl.$^4$ .............................. G11B 23/10
[52] U.S. Cl. .................................. 242/199
[58] Field of Search .............. 242/199, 198, 197; 361/212, 214

[56] References Cited

U.S. PATENT DOCUMENTS

| 3,556,433 | 1/1971 | Abitboul | 242/199 |
| 3,556,434 | 1/1971 | Koeppe | 242/199 |
| 3,565,367 | 2/1971 | Yamamoto | 242/199 |
| 3,675,875 | 7/1972 | Schmidt | 242/199 |
| 3,712,559 | 1/1973 | Schwartz | 242/199 |
| 3,891,159 | 6/1975 | Nelson | 242/199 |
| 4,102,515 | 7/1978 | Milants | 242/199 |
| 4,127,242 | 11/1978 | Hashimoto et al. | 242/199 |
| 4,289,285 | 9/1981 | Ishida et al. | 242/199 |
| 4,328,936 | 5/1982 | Bordignon | 242/199 |
| 4,333,620 | 6/1982 | Ishida et al. | 242/199 |
| 4,376,519 | 3/1983 | Ishida et al. | 242/199 |

FOREIGN PATENT DOCUMENTS 2909503  9/1979  Fed. Rep. of Germany ...... 242/199

Primary Examiner—Stephen Marcus
Assistant Examiner—Leo J. Peters
Attorney, Agent, or Firm—Birch, Stewart, Kolasch & Birch

[57] ABSTRACT

A recording tape cartridge which comprises a recording tape wound in a roll on each of a pair of hubs and at least one slip sheet laid to elastically support the roll of the recording tape with a plurality of rib units, each of the rib units being composed of plurality of ribs projected from the slip sheet to form a generally hexagonal configuration in plan view.

9 Claims, 10 Drawing Figures

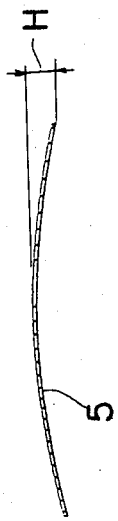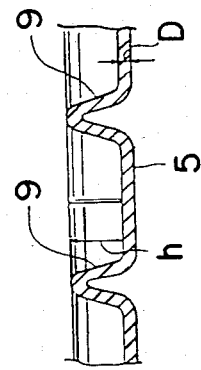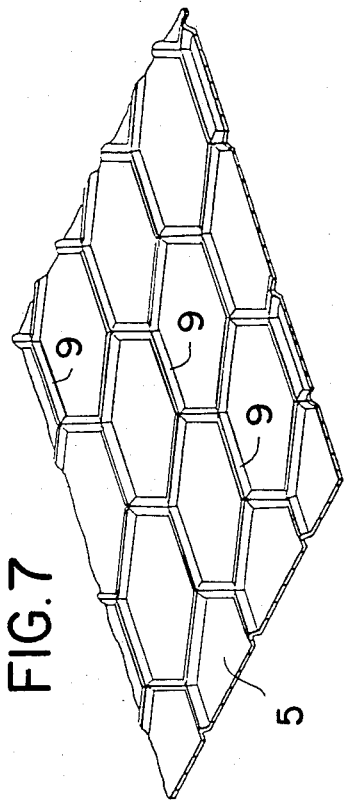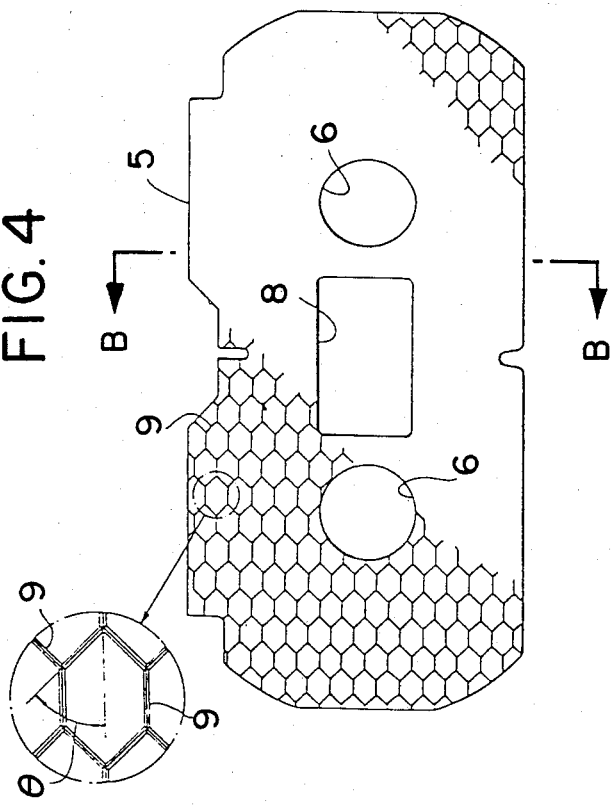

RECORDING TAPE CARTRIDGE

FIELD OF THE INVENTION

The present invention relates to a recording tape cartridge which has slip sheets contained in its cartridge case, and more particularly, to an improvement in the configuration of ribs embossed on the slip sheets to give excellent cushioning effect to the slip sheets, thereby improving the state of winding of the recording tape with respect to hubs while reducing frictional sound caused by sliding contact between the slip sheets and tape edges upon running of the recording tape.

BACKGROUND OF THE INVENTION

In a magnetic recording tape cartridge 1 as shown in FIGS. 1 and 2 having a magnetic recording tape 3 wound around a pair of hubs 4, in order to facilitate smooth rotation of the hubs 4 and stable running of the recording tape 3, there are interposed slip sheets 5 in one gap between the inner surface of a top wall 1a of the tape cartridge 1 and the top end surface 3a of the roll of the magnetic recording tape 3 including the top end surface of the hubs 4 and in another gap between the inner surface of a bottom wall 1b of the tape cartridge 1 and the bottom end surface 3b of the roll of the magnetic recording tape 3 including the bottom end surface of the hubs 4.

In such a recording tape cartridge, gaps are defined respectively in width of about 0.5 mm. Since the slip sheets 5 are essentially adapted to fill up the gaps, it is desirable to give cushioning effect to the slip sheets 5, which are elastically brought into contact with the hub end surfaces and the tape edges. Thus, it is well known in the art to emboss the slip sheets 5 with various configurations of projections or ribs while curling the slip sheets 5 in a convex manner as shown in FIG. 5.

When thus provided with the projections or ribs and curled in a convex manner, the slip sheets 5 prevent swaying of the hubs 4 and vertical movement of the recording tape 3, thereby improving the state of winding of the recording tape 3 with respect to the hubs 4 and stabilizing the tape running.

However, there comes into question the configuration of the ribs to be embossed on the slip sheets 5. Depending on the selected configuration, the ribs might be flattened by repeated use, resulting in loss of their essential function. Further, since the frictional sound is raised by increase in frictional pressure of the slip sheets 5 against the hub end surfaces and the tape edges, the configuration of the ribs must be selected to reduce such frictional sound.

In an example of the conventional recording tape cartridge as shown in FIG. 1, the slip sheets 5 are provided with a plurality of projections P which are projectingly formed in a hollow hemispherical configuration over the entire surfaces thereof. Since the respective configurations are not linked with one another in such a construction, the ribs are liable to be flattened and thus it is difficult to maintain the cushioning effect of the slip sheets for a long period of time. It is well known in the art that the slip sheets are longitudinally curled in a convex manner as shown in FIG. 5 so that the central highest portions in the widthwise direction thereof are faced to the end surfaces of the hubs 4 and the end surface of the roll of the recording tape to further prevent swaying of the hubs 4 and vertical movement of the recording tape 3. However, when the projections P are embossed in a dotted manner on such curled slip sheets 5, only the central portions in the longitudinal and widthwise directions of the slip sheets 5 are apt to be reformed in convexly swollen forms, and the cushioning effect cannot be obtained at the peripheral portions of the slip sheets, and it is difficult to maintain and/or reinforce the curling of. the slip sheet. Such slip sheets are effective, though, in improving slidability and reducing the frictional sound since contact areas of the hub end surfaces and the tape edges with respect to the slip sheets are reduced particularly when the slip sheets are set in place with the surfaces of the ribs faced to the hub end surfaces and the tape edges.

Thus, ribs or projections to be embossed on the slip sheets 5 are preferably continuous in both longitudinal and widthwise directions over the entire surfaces of the slip sheets 5. For this purpose, there are proposed other slip sheets as shown in FIGS. 9 and 10 in which each of the rib units is formed in a triangular configuration 91 (see FIG. 9) or a rectangular configuration 92 (see FIG. 10) in plan view.

However, a series of triangular and/or rectangular ribs 91 and 92 in linear linkages of the ribs. Consequently, the slip sheets are subjected to creasing along the linking lines, to reduce strength of the ribs 9 themselves. Further, when the slip sheet 5 are curled in the aforementioned convex manner, the central portions in the longitudinal and widthwise directions of the slip sheets are apt to be convexly swollen similarly to those embossed with the hemispherical projections in a dotted manner, and likewise it is difficult to maintain and/or reinforce the curling characteristics. Still further, since the ribs 9 are continuous in a linear manner, the frictional sound is spread over the entire surfaces of the slip sheets, leading to increase of the frictional sound.

SUMMARY OF THE INVENTION

It is an essential object of the present invention to overcome the aforementioned disadvantages of the prior art by improving the configuration of ribs to be embossed on the slip sheet by forming hexagonal unit ribs which are linked in both longitudinal and cross directions over the entire surface of the slip sheet thereby making hexagonal patterns.

Another object of the present invention is to provide a recording tape cartridge with improved slip sheets to reduce friction noise between the tape edges and the slip sheets when the recording tape is running.

A further object of the present invention is to provide a recording tape cartridge which enables the take up of the recording tape on a roll with the tape edges to be aligned at generally the same level.

A further object of the present invention is to provide a recording tape cartridge in which the slip sheets can be prevented from undesired deformation so as to always elastically support the rolls of the recording tape.

According to the present invention, there is provided a recording tape cartridge which comprises a recording tape wound in a roll on each of a pair of hubs and at least one slip sheet laid on one of the inner surfaces of a wall member of the cartridge to elastically support the roll of the recording tape with a plurality of rib units, each of the rib units being composed of plurality of ribs projected from the slip sheet to form a hexagonal configuration in plan view with the rib units continued with one another substantially all over the slip sheet.

BRIEF EXPLANATION OF THE DRAWINGS

FIG. 4 is a top plan view of a slip sheet contained in the recording tape cartridge;

FIG. 5 is a cross sectional view taken along the line B—B in FIG. 4;

FIG. 6 is an enlarged cross sectional view of an essential portion of the slip sheet;

FIG. 7 is a fragmented perspective view of the slip sheet;

DESCRIPTION OF THE PREFERRED EMBODIMENTS

Figure 3:
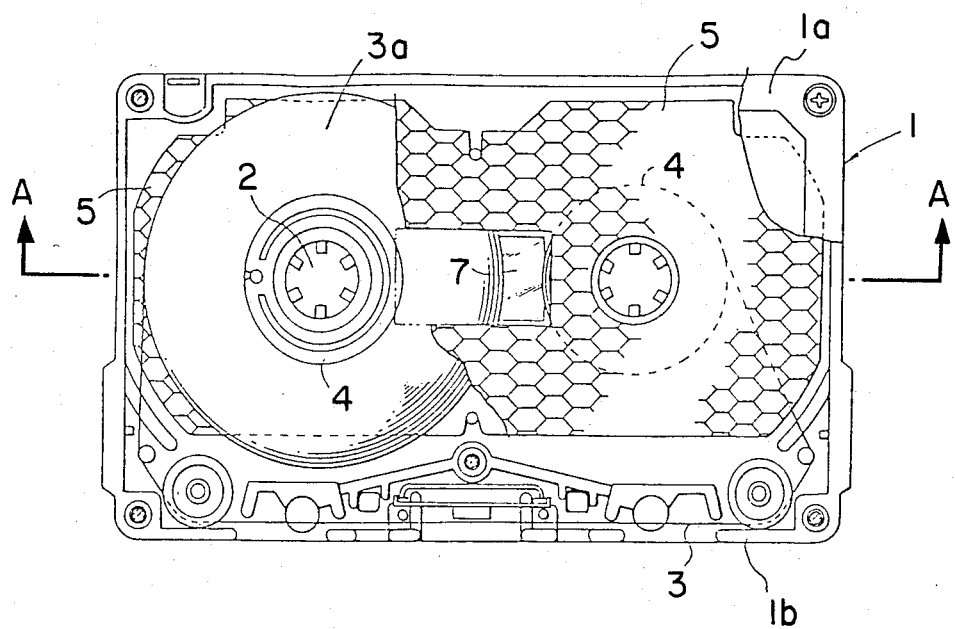
FIG. 3 is a partially fragmented top plan view of the magnetic recording tape cartridge according to the present invention.
Figure 9:
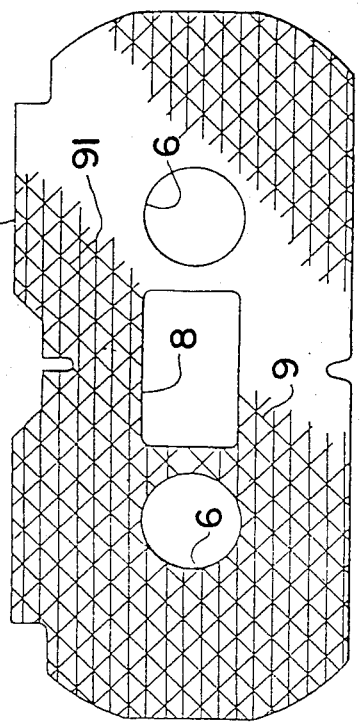
FIGS. 9 and 10 are top plan views respectively showing examples of conventional slip sheets.

In FIG. 3 and of the drawings, there is shown a magnetic recording tape cartridge according to the present invention, which comprises a cartridge case 1 having drive shaft insertion holes 2 in longitudinal left and right positions thereof and a pair of hubs 4 rotatably mounted in the inner left and right portions thereof for winding a magnetic recording tape 3. The magnetic recording tape 3 is drawn out from one hub 4 along the front surface of the cartridge case 1 to be taken up by the other hub 4.

As shown in FIG. 4, each of the slip sheets 5 is elongated in the longitudinal direction substantially in a rectangular form, and has circular holes 6 corresponding to the drive shaft insertion holes 2 of the cartridge case 1 and a rectangular hole 8 corresponding to a transparent windows 7 formed in the top wall 1a and the bottom wall 1b of the cartridge case 1 between the drive shaft insertion holes 2. The slip sheet 5 is embossed, toward the surface to be in sliding contact with the tape edges, with a plurality of ribs 9 which are projectingly formed to be hexagonal in plan view and V-shaped in section, and linked with one another in the longitudinal and widthwise directions over the entire surface of the slip sheet 5. Further, the slip sheet 5 is curled in a convex manner when viewed from the widthwise side as shown by line B—B with the face along the longitudinal direction uncurled such that the central portion relative to the widthwise direction thereof is faced to the hub end surface and the tape edge. The unit rib 9 is in the form of a longitudinally elongated equilateral, inequiangular hexagon, to maintain curling characteristics given to the slip sheet 5. The angle $\theta$ in FIG. 4 is set at 45°.

The slip sheet 5 is preferably made of a tetra fluoro ethylene resin mixed with carbon black or graphite powder. Since tetra fluoro ethylene resin is inferior in filmability, such material is formed in a block, from which the respective slip sheets 5 are cut to be curled in the aforementioned manner, and then embossed with the ribs 9. The slip sheet 5 may also be made of other plastic sheet material such as polyester, polyethylene or polybutyeneterephthalate, and may be processed to be curled after embossing of the ribs 9.

When the surface of the slip sheet 5 is charged with static electricity by sliding contact with the hub 4 and the recording tape 3, it may lead to an increase in the torque for winding up the magnetic recording tape 3 and occurrence of noise in reproduction of the magnetic records. Thus, it is desirable to mix electrically conductive material such as graphite powder or carbon black in the material of the slip sheet 5 or to coat the surface of the slip sheet 5 with an electrically conductive film, to reduce the surface electrical resistance of the slip sheet 5 to an allowable range below $10^{13}$ $\Omega/cm^2$, preferably below $10^{12}$ $\Omega/cm^2$, so that the slip sheet 5 is not charged with static electricity.

In the magnetic recording tape cartridge as shown in the drawings, gaps $g_1$ and $g_2$ are defined between the upper and lower inner wall surfaces of the cartridge case 1 and the upper and lower edges of the recording tape 3 for interposition of the slip sheets 5 respectively in length of about 0.5 mm i.e., 1 mm in total. Therefore, the height H (see FIG. 5) of the curled central portion of the slip sheet 5 is preferably set to be about 6 mm in a free condition, with a reaction force set to be about 2-5 g when the slip sheet 5 is pressed with the height H of 0.5 mm.

The thickness D of the slip sheet 5 itself is selected from a range of about 30-200 $\mu$m, while the length of one side of the rib 9 is set to be about 1-10 mm and the height h of projection of the rib 9 is set to be about 5-200 $\mu$m. It is to be noted that the cushioning effect cannot be obtained if the height of the projection of each rib 9 is less than 5 $\mu$m, while an excess clamping force is applied to the magnetic recording tape 3 if the height of each rib 9 exceeds 200 $\mu$m, resulting in damage of the tape edges and an increase of the frictional sound.

By virtue of the curling formed over the slip sheet 5 and the hexagonally-patterned ribs 9 embossed on the entire surface of the slip sheet 5, an excellent cushioning effect is applied by the slip sheet 5 such that the hubs 4 are prevented from swaying while being smoothly rotated and the magnetic recording tape 3 is prevented from vertical movement so as to run in a stable manner. Since the substantial contact areas of the surfaces of the slip sheet 5 with respect to the hub end surfaces and the tape edges are reduced by provision of the ribs 9, slidability thereof is improved to reduce the frictional sound. Even if repeatedly used for a long period of time, the ribs 9 reinforce one another preventing flattening thereof since the unit ribs 9 are linked with one another in the longitudinal and widthwise directions of the slip sheet in hexagonal patterns, thereby stably ensuring long-time use. Further, curling of the slip sheet 5 is effectively maintained in a good condition.

Figure 8:
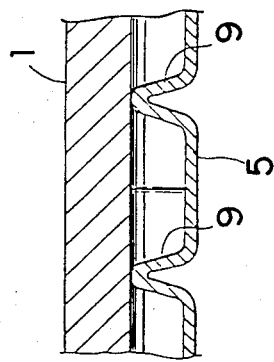
FIG. 8 is an enlarged cross sectional view showing an essential portion of another embodiment of the present invention.

Though the slip sheet 5 is formed so as to be curled in a convex manner in the aforementioned embodiment, the present invention is not necessarily limited to such a construction. For example, as shown in FIG. 8, the slip sheet 5 may be kept in a flat condition while the projecting surfaces of the hexagonal ribs 9 are brought into contact with the inner surfaces of the cartridge case 1 in a butting manner. Though, in this case, the frictional sound is not substantially reduced, the ribs 9 are effectively prevented from flattening, thereby facilitating development of the cushioning effect of the slip sheet 5.

Needless to say, the present invention can be applied to various types of recording tape cartridges such as microminiaturized recording tape cartridges, i.e., so-called "microcassette" tape cartridges.

Since the slip sheet 5 according to the present invention is entirely embossed with the ribs 9 linked in the longitudinal and cross directions to form hexagonal patterns, the unit ribs 9 reinforce with one another by linkage so that the slip sheet 5 is omnidirectionally strengthened, differing from that having triangular or square ribs. Consequently, the slip sheet 5 develops excellent elasticity to prevent swaying of the hubs 4 and vertical movement of the magnetic recording tape 3, thereby improving the condition of winding of the recording tape 3 with respect to the hubs 4 and improving stability during the tape running. Even if the slip sheet 5 is in sliding contact with the hub end surfaces and the tape edges, the slip sheet 5 is effectively prevented from creasing. Further, since the provision of the ribs 9 reduces the substantial contact areas of the surfaces of the slip sheet with respect to the hubs 4 and the tape edges, the slip sheet 5 is also effective in improving slidability and reducing the frictional sound.

The present invention is now described in further detail with reference to experimental examples thereof and reference examples.

EXAMPLE 1

A sheet blank having a thickness of 90 μm was cut from a block of tetra fluoro ethylene resin mixed with 15% by weight of graphite powder with curling effected at a height H of 6 mm in a free condition and reaction force set about 2–5 g when the slip sheet is pressed to change the height H of 0.5 mm, and then embossed with equilateral inequiangular hexagonal ribs 9 each having side length of 3 mm and height h of 60 μm, to form the slip sheet 5 as shown in FIG. 4. with the width of 48 mm and the longitudinal length of 96 mm. The slip sheet 5 was assembled in the recording tape cartridge shown in FIG. 3 in a condition that the convexly curled portion and the surfaces of the ribs were elastically brought into contact with the tape edges.

EXAMPLE 2

A flat sheet of polyester, having thickness of 90 μm, mixed with 15% by weight of graphite powder was embossed with the hexagonal ribs 9 in a similar manner to Example 1 without effecting the curling to form a non-curled slip sheet 5, which was assembled in the cartridge case 1 in a similar manner to Example 1, except that the surfaces of the ribs 9 were brought into contact with the inner wall surfaces of the cartridge case 1.

REFERENCE EXAMPLE 1

Figure 10:
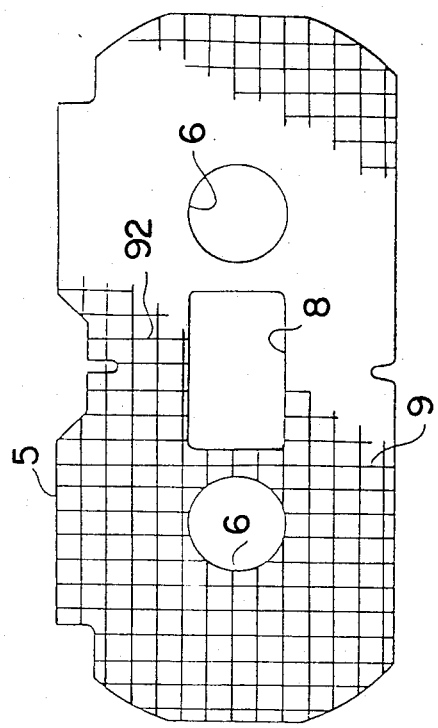

A slip sheet 5 was prepared in a similar manner to Example 1 except that each of the ribs 9 was prepared in the form of a regular square having side length of 0.5 mm and height of 60 μm as shown in FIG. 10.

REFERENCE EXAMPLE 2

Figure 1:
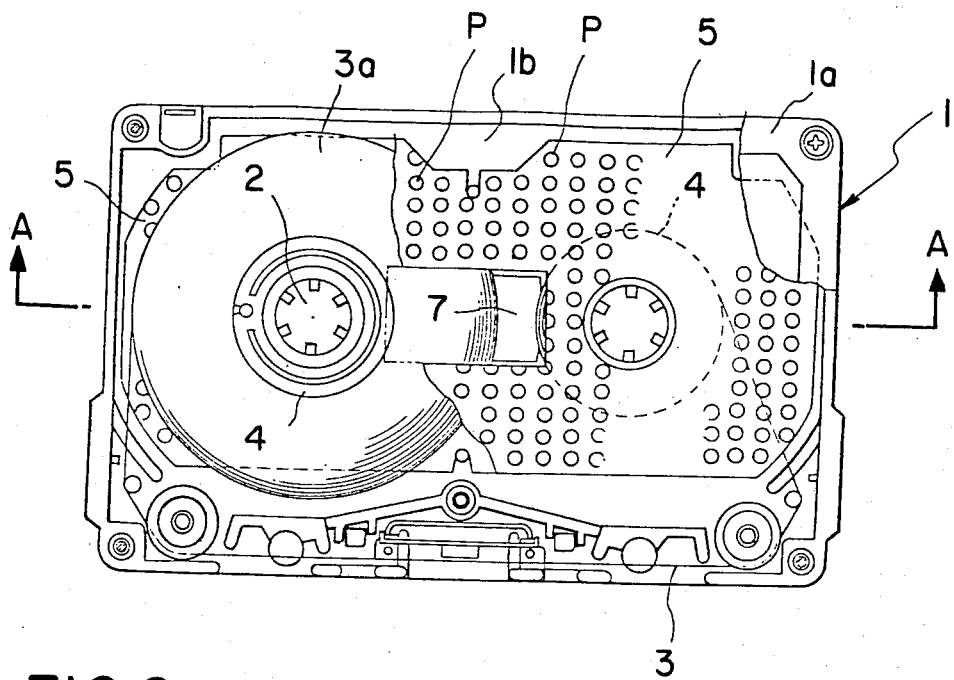
FIG. 1 is a partially fragmented top plan view of a conventional recording tape cartridge.
Figure 2:
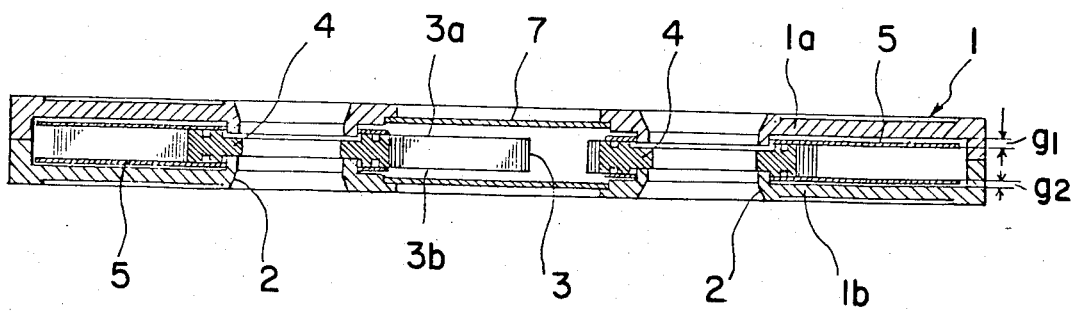
FIG. 2 is a cross sectional view taken along the line A—A in FIG. 1.

A flat polyester sheet, having thickness of 90 μm, mixed with 15% by weight of graphite powder was embossed with hemispherical hollow projections each having a diameter of 1 mm and a height of 60 μm, to form the slip sheet 5, which was assembled in the recording tape cartridge shown in FIG. 1 in a condition that the surfaces of the projections were brought into contact with the tape edges.

REFERENCE EXAMPLE 3

The slip sheet 5 was prepared by a flat polyester sheet, having thickness of 200 μm, mixed with 15% by weight of graphite powder without curling nor embossing of the ribs, and was assembled in the recording tape cartridge shown in FIG. 1.

The recording tape cartridges thus prepared with the aforementioned examples were mounted on recording-/reproducing apparatuses.

The respective recording tape cartridges were mounted on recording/reproducing apparatuses to run the magnetic recording tapes 3 for 300 hours under the normal temperature, and then the magnetic recording tapes 3 were fastly forwarded for measurement of level of the maximum frictional sound caused by the friction of the hub end surfaces and the tape edges with respect to the slip sheets 5 at positions 10 cm remote from the recording/reproducing apparatuses. The results are as follows:

| | |
|---|---|
| Example 1 | 50 db |
| Example 2 | 52 db |
| Reference Example 1 | 56 db |
| Reference Example 2 | 55 db |
| Reference Example 3 | 54 db |

As obvious from these results, the frictional sound was most reduced by the slip sheet 5 of example 1, though this slip sheet 5 was subjected to curling, since provision of the ribs 9 reduced the substantial contact areas of the surfaces of the slip sheet 5 with respect to the hub end surfaces and the tape edges. With respect to example 2, the frictional sound was reduced to be less than those with respect to reference examples 1, 2 and 3, since the slip sheet 5 is not deformed over the whole, including the ribs 9. With respect to each of examples 1 and 2, further, the range of variation of the frictional sound from the beginning to the end of winding of the magnetic recording tape 3 with respect to one hub 4 was small. On the contrary, the level of the frictional sound was high in each of Reference examples 1, 2 and 3 possibly since the slip sheet 5 was deformed, the level of the frictional sound being made particularly high in the beginning and the end of winding of the magnetic recording tape 3 to the hub 4 due to swaying of the hubs with vertical movement.

Next, the aforementioned recording tape cartridges were mounted on recording/reproducing apparatuses to run the magnetic recording tape 3 for 300 hours under the normal temperature, and then dismantled for observation of the condition of each part. No disorder nor deformation was recognized on the slip sheets of examples 1 and 2, and the condition of winding of the magnetic recording tapes 3 to the hubs 4 were well-regulated in such a manner that the tape edges on the roll of the magnetic recording tape were aligned generally in a same level to make the upper end surface and the lower end surface of the roll flat. Said condition was particularly excellent in example 1. In example 1, further, curling of the slip sheet 5 was effectively maintained in a good condition. On the contrary, the ribs 91 were partially deformed, and winding of the recording tape 3 to the hubs 4 was considerably out of condition in reference example 2. In reference example 3, the surface of the slip sheet 5 in contact with the hubs 4 and the recording tape 3 was abraded by sliding contact there-with, and the slip sheet 5 was creasedly deformed while winding of the recording tape 3 to the hubs 4 was remarkably out of condition.

It is to be noted that the slip sheets 5 are not necessarily provided in two, in the upper and lower portions, and when the recording tape cartridge is a one-sided type, the slip sheet 5 may be provided in one, only in the lower portion of the interior of the cartridge case 1.

The invention being thus described, it will be obvious that the same way be varied in many ways. Such variations are not to be regarded as a departure from the spirit and scope of the present invention, and all such modifcations as would be obvious to one skilled in the art are intended to be included within the scope of the following claims.

What is claimed is:

1. A recording tape cartridge complex which comprises a recording tape cartridge having a upper and lower wall member, each with an inner surface, a recording tape with respective edges would in a roll on each of a pair of hubs provided on at least one of said upper and lower wall members of said tape cartridge and at least one slip sheet comprising apertures corresponding to said hubs laid on at least one of said inner surfaces of at least one of said wall members of said cartridge to elastically support said roll of the recording tape, said at least one slip sheet comprising a plurality of rib units, each of said rib units being composed of a plurality of ribs which project from said slip sheet to form a hexagonal configuration in plan view with said rib units linked in both longitudinal and widthwise directions over the entire surface of said slip sheet in such a manner that one side of said hexagonal configuration of said respective rib units forms a common side with an adjoining hexagonal rib unit so as to form a multiplicity of irregular lines corresponding to said common-adjoining sides of said rib units extending from respective ends of said slip sheet.

2. The recording tape cartridge complex according to claim 1, wherein the slip sheet is laid on a respective inner surface of a corresponding wall member of said cartridge such that said ribs face a corresponding tape edge.

3. The recording tape cartridge complex according to claim 1, wherein said slip sheet is curled relative to said widthwise direction and non curled along said longitudinal direction.

4. The recording tape cartridge complex according to claim 2, wherein said slip sheet is curled relative to said widthwise direction and non curled along said longitudinal direction.

5. The recording tape cartridge complex according to claim 1, wherein said slip sheet is composed of a tetra-flouoroethylene resin material.

6. The recording tape cartridge complex according to claim 5, wherein said slip sheet is composed to tetra-fluoro ethylene resin containing graphite powder or carbon black.

7. The recording tape cartridge complex according to claim 1, wherein said slip sheet has a thickness of about 30 $\mu$m to 200 $\mu$m, with a length of each side of said ribs being 1 to 10 mm and a height of 5 $\mu$m to 200 $\mu$m.

8. The recording tape cartridge complex according to claim 6, wherein surface resistance of said slip sheet is less than $10^{13}\Omega$.

9. The recording tape cartridge according to claim 1, wherein each of said rib units is formed as a longitudinally elongated equilateral, inequiangular hexagon.

* * * * *